Oct. 21, 1924.
J. S. GREENLEY ET AL
1,512,759
AUTOMOBILE WINDOW
Filed Feb. 28, 1921
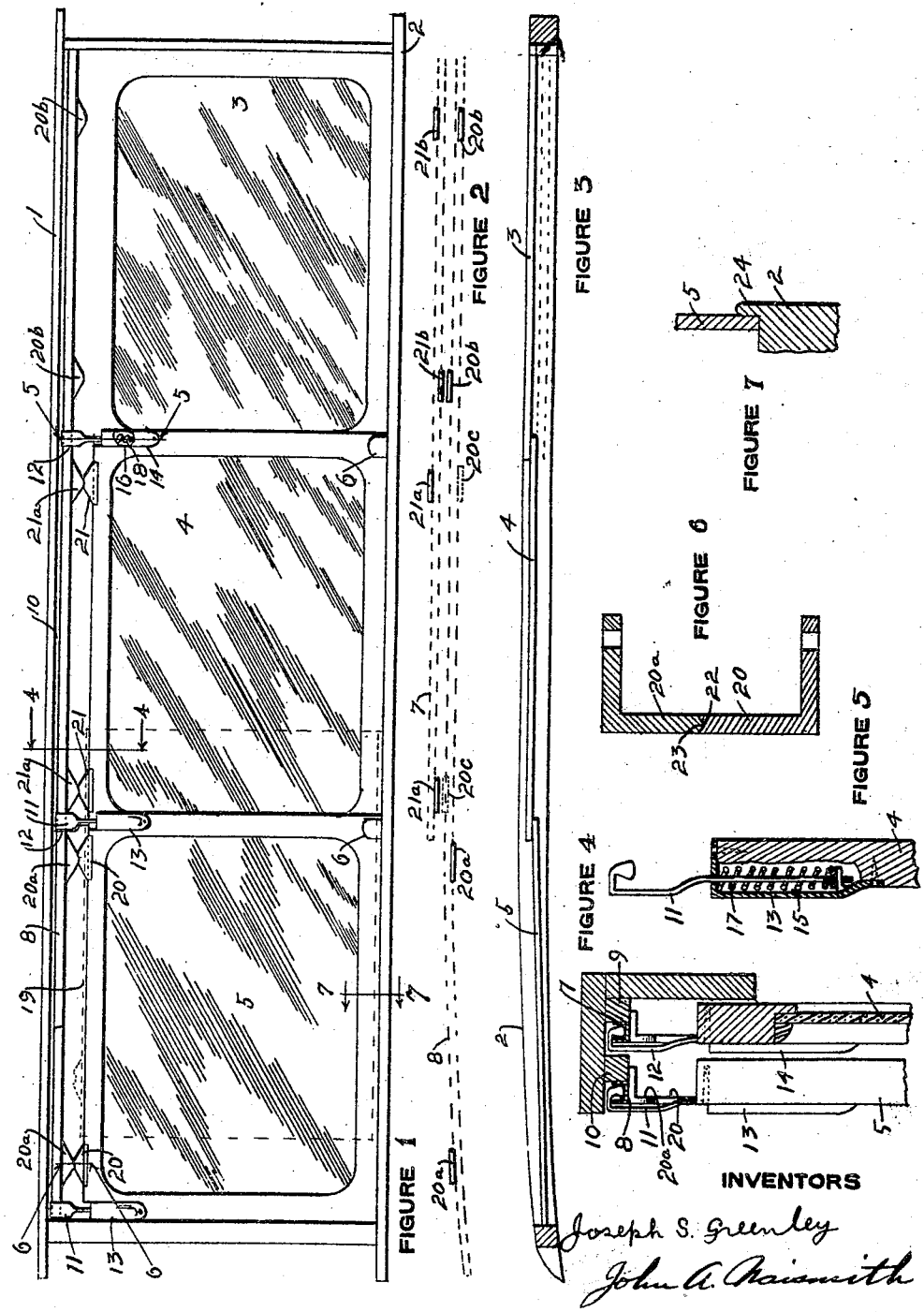
INVENTORS
Joseph S. Greenley
John A. Naismith Patented Oct. 21, 1924.

1,512,759

UNITED STATES PATENT OFFICE.

JOSEPH S. GREENLEY AND JOHN A. NAISMITH, OF SAN JOSE, CALIFORNIA, ASSIGNORS, BY MESNE ASSIGNMENTS, TO SAID JOHN A. NAISMITH.

AUTOMOBILE WINDOW.

Application filed February 28, 1921. Serial No. 448,450.

*To all whom it may concern:*

Be it known that we, JOSEPH S. GREENLEY and JOHN A. NAISMITH, citizens of the United States, and residents of San Jose, in the county of Santa Clara and State of California, have invented certain new and useful Improvements in Automobile Windows, of which the following is a specification.

Our invention relates particularly to suspension and positioning mechanism for the the sliding windows of automobile tops.

It is the object of our invention to provide a simple, effective, and positively acting mechanism whereby a sliding window may be moved into a predetermined position and securely held against accidental displacement and prevented from rattling. It is another object of our invention to provide a means cooperating with the above mentioned mechanism whereby a weather proof joint is secured at the bottom edge of the window when in a predetermined position. It is a further object of our invention to provide a device of the character indicated that will permit the use of unbroken tracks, and in which the number of parts of different conformation are reduced to a minimum.

In the drawing: Figure 1 is an interior side elevation of an automobile top frame showing its sliding windows mounted in accordance with this invention.

Figure 2 is a diagrammatical plan view of the tracks carrying the sliding windows and showing the arrangement of the positioning devices.

Figure 3 is a diagrammatical plan view of the sliding windows showing their relative position when closed and open.

Figure 4 is an enlarged section on 4—4 of Figure 1.

Figure 5 is an enlarged section on 5—5 of Figure 1.

Figure 6 is an enlarged section through 6—6 of Figure 1.

Figure 7 is an enlarged section through 7—7 of Figure 1.

Referring more particularly to the drawing, 1 indicates a portion of the framework of an automobile top and 2 the upper side edge of the automobile body, a stationary window being shown at 3 and movable windows at 4 and 5 respectively, the movable windows being guided at their lower edges by separator or guide members.

At 7 is shown a track for window 4, its forward end terminating adjacent to the forward end of the window as indicated in the diagrammatical illustration in Figure 2. At 8 is shown a track for window 5 and extending the full length of frame 1 and arranged parallel with track 7 throughout the length of the latter. These tracks 7 and 8 are mounted upon the sides of supporting strips 9 and 10 respectively, the latter being secured to the under surface of the upper portion of the frame as shown.

Each window 4 and 5 is mounted on its respective track by means of a pair of hangers as 11—11 and 12—12 engaging the track and extending downwardly into cases 13—13, 14—14 set in windows 4 and 5 in the relative position shown. The cases 13—14 and the windows in which they are mounted are formed to provide pockets as 15 and 16. The hangers are provided with springs as 17—17 and 18—18 inserted between their lower ends and the upper ends of their respective pockets whereby the windows are normally held in a raised position as indicated in dotted lines at 19. While in this raised position the windows may be moved freely back and forth on their respective tracks.

As a means for securing the windows 4—5 in an advanced or retracted position we provide a number of cam elements as 20—20 and 20ª—20ª, 21—21 and 21ª—21ª, 20ᵇ—20ᵇ, 21ᵇ—21ᵇ. These elements are arranged in pairs and preferably with one member of each pair as 20 having a groove formed therein as at 22, and the other member as 20ª having an edge formed thereon as 23 to engage the groove in the other cam in conjunction with which it operates. The pairs of cams on each window, as 20—20ª, 20—20ª, are arranged one on each side of the vertical plane in which the window slides, so that when window 5 is moved from the advanced to the retracted position the fixed cams 20—20 on its upper edge pass freely to engagement with cams 20$^b$—20$^b$ also offset on strip 10, the rear cam 20 freely passing the forward cam 20$^b$.

In like manner when window 4 is moved rearwardly the rear cam 21 passes the forward cam 21$^b$ and the two cams 21—21 simultaneously engage the two cams 21$^b$—21$^b$.

Since in each case one cam of each pair is formed with a convex and the other with a concave portion adapted to engage the said convex portion of the first cam, and since the movable cams are normally held in overlapping relationship to the immovable cams by the spring construction described, when the window is in the unlocked position the result is that when a window is moved sufficiently far in either direction the cams thereon engage a fixed pair of cams and move over the curved edges thereof and drop into engagement therewith, the springs and the form of the cams cooperating to securely lock the window in position. In this manner window 4 is held in a forward position in engagement with cams 21$^a$—21$^a$, and in a retracted position in engagement with cams 21$^b$—21$^b$. Likewise window 5 is held in a forward position in engagement with cams 20$^a$—20$^a$, and in a retracted position in engagement with cams 20$^b$—20$^b$.

When one cam passes over the shoulder of the other whereby the two may engage each other as described, the window is caused to lower from its raised position to a point below the level of its final position, and then raise slightly to the said final and locked position. This movement would ordinarily leave an open space between the bottom of the window and the top of the automobile body or door edge. In order to provide a weather proof joint at this point we provide a bead 24 upon the upper edge of the door or automobile body so that the window may be lowered and then slightly raised as it settles into a locked position at the end of its movement. The proportions of the bead must conform, of course, to the proportions of the concave and convex portions of the engaging cams.

It is particularly pointed out that in this construction the window is securely held in a fixed position at either end of its range of movement or, indeed, wherever cams are arranged to engage the cam on the window moved. For instance, in this construction the cams may be so arranged that a forward window as 5 may be moved to engage cams as shown in dotted lines at 20$^c$—20$^c$ in Figure 2 if it is not desired to move it back to the limit of its open position. Another particularly advantageous feature of this construction is that no special alteration is required in the track structure and the hanger shoes may be made in any form to move freely in the track. Furthermore, all of the hangers may be made identical in form and construction, and all of the pairs of cams may also be made identical in form and construction.

It is to be understood, of course, that while we have herein shown and described one particular embodiment of our invention, changes in form, construction and method of operation may be made within the scope of the appended claims.

We claim:

1. A track, a window slidably mounted thereon, a resilient suspension for said window from said track, and means inserted between the window and the track at spaced points and independent of the suspension for actuating said resilient suspension.

2. A track, a window slidably mounted thereon, a resilient suspension for said window from said track, and means for actuating said resilient suspension at a predetermined point in the path of travel of the said window, said means embodying cooperating and interlockable parts rigidly carried respectively by the window and the track mounting.

3. A track rigidly mounted with relation to an automobile top, a window slidably mounted thereon, a resilient suspension for said window from said track, and automatically operating means comprising cooperating parts fixedly related to the window and track respectively for actuating said resilient suspension at given spaced points in the path of travel of the said window.

4. A rigid track, a window slidably mounted thereon, a resilient suspension for said window, and spaced pairs of cams inserted between the window and track for actuating said resilient suspension and locking said window in a predetermined position, one cam of each pair being fixed to the window and the other cam of each pair being fixedly related to the track.

5. A rigid track, a window slidably mounted thereon, a resilient suspension for said window, and spaced pairs of cams inserted between the window and track for actuating said resilient suspension and locking said window against longitudinal and lateral movement, one cam of each pair being fixed to the window and the other cam of each pair being fixedly related to the track.

6. A track, a window slidably mounted thereon and spaced a distance therefrom, a resilient suspension for said window inserted between said window and track, upwardly extending and spaced cams carried by the upper edge of said window, fixed cams arranged to engage said first mentioned cams when said window is open, and fixed cams arranged to engage said first mentioned cams when said window is closed.

7. The combination with an automobile top having openings in the side thereof, of a track arranged over the forward and rearward openings and extending backwardly thereof, a second track arranged over the rearward opening and extending backwardly thereof in parallel relation to said first track, a pair of spaced and offset depending cams arranged adjacent to each track and over said openings, corresponding cams arranged adjacent to each track at the rearward end thereof, a window slidably mounted on each track, spaced and offset upstanding cams arranged on each window to engage their respective pairs of fixed and depending cams, and a resilient suspension between each window and its respective track whereby to permit the engagement of the respective pairs of cams.

8. A vehicle window comprising in combination with the upper edge of the automobile body and the top thereof, a slidable window, a track from which the window is resiliently suspended, and cam means arranged in the path of the window for moving the latter down into engagement with the upper edge of the automobile body against the tension of the resilient suspension.

9. In combination, an overhead track, hook shaped hangers engaged with the track, a window resiliently connected to the hangers, means operable by and during movement of the hangers on the track for seating the window on its sill against the tension of the resilient connections between the hangers and the window.

10. The combination with a motor vehicle and its top, of slidable windows, hangers for supporting said windows, a fixed rail carried by the top for supporting said windows, springs carried by each hanger for raising the windows out of contact with the motor car at their lower edges, and clamping means located above the windows and adapted to force the lower edges of the windows into engagement with the motor vehicle to lock them in position.

JOSEPH S. GREENLEY.
JOHN A. NAISMITH.